United States Patent [19]

Floryan et al.

[11] 4,157,434

[45] Jun. 5, 1979

[54] PROCESS FOR REMOVING METAL-EDTA COMPLEX AND FREE EDTA SALTS FROM MIXED AQUEOUS-ORGANIC MEDIA

[75] Inventors: Daniel E. Floryan, Glenmont, N.Y.; Daniel W. Fox, Pittsfield, Mass.

[73] Assignee: General Electric Company, Pittsfield, Mass.

[21] Appl. No.: 866,010

[22] Filed: Dec. 30, 1977

[51] Int. Cl.$^2$ ............................................. C08G 65/46
[52] U.S. Cl. ................................. 526/71; 210/500 R; 210/502; 528/212
[58] Field of Search ...................... 260/47 ET; 526/71; 528/212; 210/500 R, 502

[56] References Cited

U.S. PATENT DOCUMENTS 3,951,917  4/1976  Floryan et al. ................. 260/47 ET

OTHER PUBLICATIONS

Chem. Abstracts 53, 17629g, Centini et al. Gazz. Chim. Ital., 88, 607–616 (1958).

Chem. Abstracts, 58, 8534, Kavalerova et al., Zh. Fiz. Khim., 37, 226–227 (1963).

*Primary Examiner*—Lester L. Lee
*Attorney, Agent, or Firm*—Morgan, Finnegan, Pine, Foley & Lee

[57] ABSTRACT

Ethylenediaminetetraacetic acid (EDTA)-complexed heavy metals alone or together with free EDTA salts are removed from solution in a mixture comprising a solvent for a polyphenylene ether resin, an antisolvent for a polyphenylene ether resin and water, by contacting the mixture with alumina for a time at least sufficient to selectively adsorb the metal-EDTA complex and free EDTA salts and recover the mixture of solvent, antisolvent and water substantially free of the metal-EDTA complex and EDTA salts. The alumina can be regenerated to nearly its full original adsorption capacity by contacting with water at a neutral or nearly neutral pH, to give an aqueous solution of the metal-EDTA complex and free EDTA salts.

11 Claims, No Drawings

PROCESS FOR REMOVING METAL-EDTA COMPLEX AND FREE EDTA SALTS FROM MIXED AQUEOUS-ORGANIC MEDIA

This invention relates to the treatment of a solent/antisolvent/water mixture resulting from the metal-catalyzed production and recovery of a polyphenylene ether resin, to selectively remove EDTA-complexed heavy metals, such as copper, manganese, nickel, vanadium, and the like alone or in admixture with unchelated EDTA salts. The resulting solvent/antisolvent/water mixture substantially free of the complexed heavy metals and EDTA salts can be treated further to separate the solvent and the antisolvent for further use in the manufacture of polyphenylene ether resins.

BACKGROUND OF THE INVENTION

The polyphenylene ether resins and methods for their preparation are well known in the art and described in the patent literature, including Hay, U.S. Pat. Nos. 3,306,874 and 3,036,875, which are incorporated herein by reference. Other methods of preparation are disclosed in Bennett and Cooper, U.S. Pat. Nos. 3,639,656 and 3,838,102, as well as Cooper and Bennett, U.S. Pat. Nos. 3,642,699, 3,661,848 and 3,733,299, also incorporated herein by reference.

The processes most generally used to produce the polyphenylene ethers involve the self-condensation of a monovalent phenol in the presence of an oxygen-containing gas and a catalyst comprising a metal-amine complex.

These processes are run in the presence of an organic solvent and the reaction is usually terminated by removal of the catalyst from the reaction mixture. This has been done by the use of aqueous solutions of acetic acid, sulfuric acid, sodium bisulfate, chelating agents such as glycine, nitrilotriacetic acid and its sodium salts or ethylenediamine tetraacetic acid (EDTA) and its sodium salts. The best prior art procedure for recovery of the polyphenylene ether itself is based on precipitation from the reaction mixture with an antisolvent, i.e., a liquid which is miscible with the reaction solvent but in which the polymer does not dissolve.

By way of illustration, in producing poly(2,6-dimethyl-1,4-phenylene ether), xylenol is oxidized in toluene solution and the polymer is precipitated by addition of methanol to the reaction mixture, after removal of the copper catalyst by extraction with acids or with complexing agents such as salts of ethylenediaminetetraacetic acid, and the like. The polymer is filtered off, washed and dried. Methanol and toluene are separated by adding water to the filtrate to produce a toluene phase and a methanol-water phase almost free of toluene; toluene and methanol are then recovered by distillation.

Such procedures are not entirely satisfactory, however, because the mixture comprising the solvent for the polymer, the antisolvent for the polymer and water also contains small amounts of dissolved metal-EDTA complex and free (unchelated)EDTA salts. It is desirable to remove the metal-EDTA complex and any free EDTA salts prior to reusing the solvent and antisolvent.

This invention is based on the discovery that metal-EDTA complexes as well as free salts of EDTA can be removed, even in small amounts, from solution in a mixture of a polyphenylene ether solvent, a polyphenylene ether antisolvent and water, by contacting the mixture with a medium comprising alumina, whereby the metal-EDTA complex and free EDTA salts are selectively adsorbed on the surface of the alumina. The alumina is, moreover readily regenerated to nearly its full adsorption capacity by flushing with water at a neutral or nearly neutral pH to give an aqueous solution of the metal-EDTA complex and EDTA salts.

The use of alumina to remove various cations, among which are copper (II) and copper (II) acetylacetate, from aqueous or chlorinated hydrocarbon solutions is known. See, e.g., Chemical Abstracts, 53, 17629 g, Centini et al, Gazz. Chim. Ital., 88,607–16 (1958); and Chem. Abstracts, 58, 8534, Kavalerova et al, Zh. Fiz. Khim., 37,226–7 (1963). It has not been previously recognized, however, that EDTA-complexed metals and/or unchelated EDTA salts can be effectively removed, even in small amounts, from mixed aqueous/organic media such as those which result from conventional metal-catalyzed processes for the manufacture of polyphenylene ethers.

DESCRIPTION OF THE INVENTION

In its broadest aspects this invention provides a process for removing a metal-EDTA complex alone or together with an unchelated salt of EDTA from solution in a mixture comprising a solvent for a polyphenylene ether resin, an antisolvent for said resin and water, the process comprising:

(a) contacting said mixture with alumina for a time at least sufficient to selectively adsorb substantially all of said metal-EDTA complex and unchelated salt of EDTA, and (b) recovering a mixture comprising the solvent for the polyphenylene ether resin, the antisolvent and water substantially free of said metal-EDTA complex and unchelated salt of EDTA.

In another aspect of the invention, the process comprises the further steps of:

(c) contacting the alumina from step (b) with water at a neutral or nearly neutral pH to separate the adsorbed metal-EDTA complex and unchelated salt of EDTA from said alumina, and (d) recovering an aqueous solution of said metal-EDTA complex and unchelated salt of EDTA.

In general, the polyphenylene ether resins are of the formula:

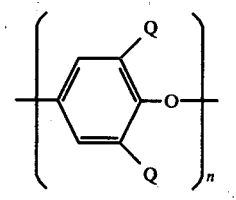

wherein the oxygen ether atom of one unit is connected to the benzene nucleus of the next adjoining unit, n is a positive integer and is at least 50 and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

The preferred polyphenylene ether is poly(2,6-dimethyl-1,4-phenylene)ether.

By way of illustration, the polyphenylene ether forming reaction is carried out using a chelatable metal ion-amine complex catalyst in an organic solvent. The oxygen-containing gas is introduced while the appropriate phenol is fed into the agitated reaction mixture at a moderate temperature, e.g., 25°–50° C. The degree of polymerization is controlled primarily by the reaction time, although catalyst activity, promoters, temperature, oxygen flow rate and other parameters have known effects. To save unnecessary detail, reference is made to the above-mentioned patents.

Upon reaching the desired degree of polymerization or molecular weight, the reaction is terminated and the metal ion component of the catalyst is separated by contacting the reaction solution with a chelating agent which is capable of forming a chelate with said metal ion, i.e., a salt of ethylenediaminetetraacetic acid. At the point where the polymerization reaction reaches the desired yield, the reaction solution will normally comprise a solution of polyphenylene ether, typically from 1 to 50% by weight and usually from 2 to 20% by weight, metal and amine, typically from about 0.005 to 1.5% by weight of metal and from about 0.5 to 3.0% by weight of amine and minor amounts of other materials, such as various promoters, byproducts, unreacted monomer, and the like. Such reaction solutions are then treated with the antisolvent to precipitate the polymer.

Preferably, the EDTA salt is added in the form of an aqueous solution, although this is not essential. If a dry solid is employed, free water formed in the polyphenylene ether synthesis is normally sufficient to dissolve the EDTA salt. The salt is preferably selected from among disodium, trisodium and tetrasodium salts of ethylenediaminetetraacetic acid. In general, amounts of from about 1 to about 50% by weight, preferably from about 10 to about 40% by weight in water, are employed. Preferably, the salt solution is added to the reaction mixture in such amounts as to obtain a molar ratio of the salt to the metal ion of from about 1:1 to about 10:1, more preferably from about 1:1 to about 3:1.

After precipitation and removal of the polyphenylene ether, the reaction mixture will comprise the solvent for the polymer, the antisolvent for the polymer, water and a solution comprising a complex of the metal ion component of the metal amine catalyst and EDTA and, usually minor amounts of the unchelated EDTA salt. This mixture is then treated in accordance with the present invention by passage through one or more adsorption "beds" comprising alumina, until substantially free of the metal-EDTA complex and any free EDTA salts. After treatment, the reaction mixture preferably contains less than 0.1 grams per liter (g/l) of metal ion, and less than 0.4 g/l of EDTA.

The alumina adsorbent can be regenerated after use by backflushing with water, preferably at a pH of from about 6 to about 8, to form an aqueous solution of the metal-EDTA complex and unchelated EDTA salt.

In preferred embodiments, a multiple-bed system comprising a plurality of adsorption columns connected in series is used. This permits the backflushing of a spent column while the others remain in operation.

DESCRIPTION OF THE PREFERRED EMBODIMENTS

The following examples are for the purpose of illustration and are not to be construed as limiting the invention.

EXAMPLE 1

A solution comprising 16% by weight of poly(2,6-dimethyl-1,4-phenylene ether) in toluene obtained from the oxidative coupling of 2,6-xylenol in the presence of a copper-amine complex catalyst, is contacted first with a 38% by weight aqueous solution of the trisodium salt of ethylenediaminetetraacetic acid, to produce a mixture of the polyphenylene ether solution and about 4% by volume of an aqueous solution of copper-ethylenediaminetetraacetic acid and the "free" ethylenediaminetetraacetic acid salt. The resulting mixture is contacted with methanol at a ratio of methanol:reaction mixture of 1.7:1 by volume, to precipitate the poly(2,6-dimethyl-1,4-phenylene ether), which is then filtered. The filtrate is a mixture comprising 60% by weight of methanol, 35% by weight of toluene, 5% by weight of water, 0.18 grams per liter of dissolved copper in the form of a complex with EDTA, and 2.5 grams per liter of dissolved trisodium salt of EDTA. The molar ratio of EDTA salt:copper is 2.5:1.

The mixture is then passed through a column packed with 1,680 grams of alumina adsorbent, Alcoa's F-1 grade, 14×28 mesh, U.S. Standard Sieve, using a flow rate of 100 milligrams per minute. The dimensions of the column are 2 inches in diameter by 3 feet in height. The first 20 milligrams of effluent from the adsorption column contains less than 0.005 grams per liter of EDTA-complexed copper, and less than 0.2 grams per liter of the trisodium salt of EDTA. Thereafter, the concentrations of complexed copper and trisodium EDTA salt in the effluent gradually increase, until the original concentration of each is attained after 70 liters of effluent have passed through.

At this point, the alumina in the column has adsorbed a total of 4.2 milligrams of copper per gram of alumina, and 60 milligrams of the trisodium salt of EDTA per gram of alumina.

The alumina is regenerated for further use by flushing the column with 4 liters of tap water, about pH 7. The effluent comprises an aqueous solution of about 2.0 g/l of copper and about 28.0 g/l of the trisodium solution of EDTA. If desired, less water can be used to give a solution having higher concentrations of these respective ingredients. Upon further use, the regenerated alumina is found to adsorb essentially the same amounts of copper-EDTA complex and free EDTA salt as before.

EXAMPLE 2

A filtrate from the antisolvent precipitation and filtration of poly(2,6-dimethyl-1,4-phenylene oxide) as in Example 1 is found to contain 0.125 g/l of copper and 1.5 g/l of "free" ethylenediaminetetraacetic acid, trisodium salt. A total of 397.2 liters of this filtrate is passed through a series of four adsorption beds, each consisting of a 2-inch diameter, 4 foot-long pipe containing 2275 grams of alumina (Alcoa alumina, grade F-1, 14×28 mesh, U.S. Standard Sieve), at a flow rate of 0.3 liters per minute. Analysis of copper in the filtrate leaving the second, third, and fourth beds over a period of time, is shown in Table 1.

TABLE 1
ADSORPTION OF COPPER-EDTA CHELATE ON ALUMINA IN MULTIPLE BED SYSTEM

| Time (Minutes) | Volume of Filtrate to Alumina Beds (liters) | Copper in Bed Effluent (g/l as Cu) | | |
|---|---|---|---|---|
| | | Bed #2 | Bed #3 | Bed #4 |
| 309 | 92.7 | .013 | 0 | 0 |
| 424 | 127.2 | .033 | 0 | 0 |
| 544 | 163.2 | .108 | 0 | 0 |
| 664 | 199.2 | .120 | .025 | 0 |
| 729 | 218.7 | .125 | .065 | 0 |
| 844 | 253.2 | | .100 | 0 |
| 964 | 289.2 | | .122 | .018 |
| 1084 | 325.2 | | | .038 |
| 1144 | 343.2 | | | .095 |
| 1324 | 397.2 | | | .125 |

Calculations show that the alumina has adsorbed 4.6 milligrams of copper per gram of alumina. The analysis of the "free" EDTA trisodium salt leaving the first bed is summarized in Table 2.

TABLE 2
ADSORPTION OF "FREE" EDTA SALT ON ALUMINA

| Time (Minutes) | Volume of Filtrate to Alumina Beds (liters) | "Free" EDTA (Na)$_3$ in Bed Effluent (g/l) Bed #1 |
|---|---|---|
| 67 | 20 | 0.180 |
| 183 | 55 | 0.390 |
| 367 | 110 | 0.720 |
| 543 | 163 | 1.150 |
| 767 | 230 | 1.500 |

Calculations show that the alumina has adsorbed 77 milligrams of "free" EDTA trisodium salt per gram of alumina. The columns are flushed with toluene, then rinsed with water to remove copper-EDTA complex and "free" EDTA trisodium salt. Analysis shows that 95% of the copper and 98% of the "free" EDTA trisodium salt are recovered with 3.75 liters of water.

EXAMPLE 3

Filtrate samples from the precipitation and filtration of poly(2,6-dimethyl-1,4-phenylene oxide) as in Example 1 are utilized in a series of continuous adsorption-water backwash cycle tests on alumina (Kaiser alumina, grade A-201, 14×28 mesh, U.S. Standard Sieve). The capacity of the alumina for adsorbing the copper-EDTA chelate is measured during various cycles, and is expressed as milligrams copper adsorbed per gram of alumina in Table 3.

TABLE 3
CAPACITY OF ALUMINA FOR COPPER-EDTA OVER EXTENDED ADSORPTION-BACKWASH CYCLES

| Cycle No. | Copper Adsorbed (mg/g of alumina) |
|---|---|
| 7 | 5.2 |
| 15 | 3.7 |
| 38 | 4.3 |
| 61 | 4.0 |
| 102 | 3.7 |

It is shown that the adsorption capacity of alumina for copper-EDTA is relatively constant over an extended number of cycles, after an initial drop within the first fifteen cycles.

Other modifications and variations of this invention are possible in the light of the above description. It is, therefore, to be understood that changes may be made in the particular embodiment described herein without departing from the scope of the invention as defined in the appended claims.

We claim:
1. A process for removing a metal-ethylenediamine tetraacetic acid complex alone or together with an unchelated salt of ethylenediamine tetraacetic acid from solution in a mixture comprising a solvent for a polyphenylene ether resin, an antisolvent for said resin and water, the process comprising:
    (a) contacting said mixture with at least an effective amount of alumina for a time at least sufficient to selectively adsorb substantially all of said metal-ethylenediamine tetraacetic acid complex and unchelated salt of ethylenediamine tetraacetic acid, and
    (b) recovering a mixture comprising said solvent for said polyphenylene ether resin, said antisolvent and said water substantially free of said metal-ethylenediamine tetraacetic acid complex and unchelated salt of ethylenediamine tetraacetic acid.
2. A process according to claim 1 which includes the additional steps of:
    (c) contacting the alumina from step (b) with water at a neutral or nearly neutral pH to separate the adsorbed metal-ethylenediamine tetraacetic acid complex and unchelated salt of ethylenediamine tetraacetic acid from said alumina, and
    (d) recovering an aqueous solution of said metal-ethylenediamine tetraacetic acid complex and unchelated salt of ethylenediamine tetraacetic acid.
3. A process as defined in claim 1 wherein said metal is copper.
4. A process as defined in claim 1 wherein said solvent is toluene.
5. A process as defined in claim 1 wherein said antisolvent is methanol.
6. A process as defined in claim 1 wherein a disodium salt of ethylenediamine tetraacetic acid is employed.
7. A process as defined in claim 1 wherein a trisodium salt of ethylenediamine tetraacetic acid is employed.
8. A process as defined in claim 1 wherein a tetrasodium salt of ethylenediamine tetraacetic acid is employed.
9. A process as defined in claim 2 wherein the pH of water is from about 6 to about 8.
10. A process for recovering a copper-ethylenediamine tetraacetic acid complex alone or together with an unchelated sodium salt of ethylenediamine tetraacetic acid from solution in a mixture comprising toluene, methanol and water, the process comprising:
    (a) contacting said mixture with at least an effective amount of alumina for a time at least sufficient to selectively adsorb substantially all of said copper-ethylenediamine tetraacetic acid complex and unchelated sodium salt of ethylenediamine tetraacetic acid, and
    (b) recovering a mixture comprising toluene, methanol and water substantially free of said copper-ethylenediamine tetraacetic acid complex and unchelated sodium salt of ethylenediamine tetraacetic acid.
11. A process as defined in claim 10 which comprises the additional steps of:
    (c) contacting the alumina from step (b) with water at a pH of from about 6 to about 8 to separate the adsorbed copper-ethylenediamine tetraacetic acid complex and unchelated sodium salt of ethylenediamine tetraacetic acid from said alumina, and
    (d) recovering an aqueous solution of said copper-ethylenediamine tetraacetic acid complex and unchelated salt of ethylenediamine tetraacetic acid.

* * * * *